United States Patent [19]

Brandes et al.

[11] 4,332,030
[45] May 25, 1982

[54] PAIRED ABSORBER ELEMENTS FOR GAS COOLED HIGH TEMPERATURE REACTORS

[75] Inventors: Siegfried Brandes, Ladenburg; Uwe Gutsch; Dietrich Leithner, both of Mannheim; Wolfgang Presser, Schwetzingen, all of Fed. Rep. of Germany

[73] Assignee: Hochtemperatur-Reaktorbau GmbH, Cologne, Fed. Rep. of Germany

[21] Appl. No.: 134,156

[22] Filed: Mar. 26, 1980

[30] Foreign Application Priority Data

Apr. 25, 1979 [DE] Fed. Rep. of Germany ....... 2916651

[51] Int. Cl.³ .............................................. G21C 7/08
[52] U.S. Cl. .................................... 376/226; 376/332
[58] Field of Search ............... 176/36 R, 58 PB, 86 R

[56] References Cited

U.S. PATENT DOCUMENTS

| | | | |
|---|---|---|---|
| 2,900,316 | 8/1959 | Kaufman, Jr. et al. | 176/35 |
| 3,212,981 | 10/1965 | Tollet et al. | 176/36 R |
| 3,227,624 | 1/1966 | Lechevallier | 176/86 R |
| 3,365,368 | 1/1968 | Fray | 176/35 |
| 3,751,334 | 8/1973 | Sturmer et al. | 176/86 R |
| 4,082,609 | 4/1978 | Schweiger | 176/36 R |
| 4,148,685 | 4/1979 | Brandes | 176/36 R |

*Primary Examiner*—Sal Cangialosi
*Attorney, Agent, or Firm*—Schwartz, Jeffery, Schwaab, Mack, Blumenthal & Koch

[57] ABSTRACT

Improvements in high temperature gas cooled nuclear reactors is effected by an arrangement of paired absorber elements, each pair comprising a rod shaped absorber element and a tubular absorber element generally surrounding the rod shaped element. With this paired combination in a reactor employing spherical fuel elements, the effective life of the absorber rods is significantly extended by protection of the rod shaped absorber element from excessive amounts of irradiation from thermal neutrons.

7 Claims, 2 Drawing Figures

PAIRED ABSORBER ELEMENTS FOR GAS COOLED HIGH TEMPERATURE REACTORS

BACKGROUND OF THE INVENTION

1. Field of the Invention

The invention concerns improvements in a gas cooled high temperature reactor wherein cooling gas flows through the core formed by a pile of spherical fuel elements from the top to the bottom and the fuel elements attain their final state of burn-up after a single passage through the pile. More specifically, the invention relates to a high temperature reactor having a reflector surrounding the core on all sides and having absorber elements directly insertable into the core and area surrounding the core to control and to shut down the high temperature reactor. A special paired arrangement of rod shaped absorber elements and tubular absorber elements provide improvements in the reactor maintenance and control.

2. Description of the Prior Art

It is known to effect the control and/or the shutdown of the so-called pebble bed reactors by means of rod shaped absorber elments which are inserted into the bed of the fuel elements without the use of special guides such as tubes, shoulders and the like. Depending on the depth of the immersion, the absorber elements increase or decrease the flow of neutrons and thus the power generated by the reactor core.

As described in West German Offenlegungsschrift No. 12 63 939, the rod shaped absorber elements consist of an external steel sheathing, the neutron absorbing material and an internal suspension tube. To cool the rod shaped absorber elements, a partial flow of the cooling gas is conducted from the area above the fission zone through the inside of the suspension tubes and then exits through orifices in the rod tips.

From West German Offenlegungsschrift No. 23 53 653, a nuclear reactor with a bed of spherical fuel elements is known, wherein the installation for the control of power and for shutting down the reactor is designed so that the rod shaped absorber elements may be inserted through the roof reflector to a predetermined insertion depth into the space enclosed by the reflector. The installation comprises a part serving to control the reactor and another to shut it down, wherein the part serving to shut down the reactor consists of absorber rods that may be inserted into the bed and the part for the control of the reactor is formed of absorber rods displaceable within the wall of the roof reflector and the cavity enclosed by the reflector and the bed. These absorber rods, which are not inserted into the bed, are particularly effective when the nuclear reactor is operated in the known manner wherein the fuel elements pass only once through the bed. In such a case, the reactor core has an axial neutron flow distribution with a maximum in the upper third of the core.

From U.S. Pat. No. 3,365,368, a gas cooled nuclear reactor is known, wherein, above the reactor core (which does not consist of spherical fuel elements), a control and shutdown device is provided. The shutdown device comprise two groups of absorber elements, one of which consists of rod shaped elements and the other of tubular absorber elements. The rod shaped absorber elements are arranged within the tubular absorber elements and are movable therein in the fashion of a telescope. However, the absorber elements performing the normal control and shutdown functions and having a correspondingly high neutron absorption capacity in this instance are of tubular configuration, while the rod shaped absorber elements have a limited absorption capacity. Their function is to control excess reactivity. Both groups of control rods are inserted entirely into channels of the reactor core, i.e. their terminal positions are at the bottom of the channels limited by the bottom reflector. The telescopic arrangement of absorber rods in absorber tubes is provided for the purpose of being able to effect both complete shutdowns and the control of the reactivity with respect to the variation in the xenon-135 concentration with the least possible number of positions of the absorber elements.

In a nuclear reactor with a single passage of the spherical fuel elements, the side reflector is exposed to a neutron dose approximately twice as high as in the case of repeated passage of the fuel elements. Various measures to protect the side reflector have, therefore, been proposed. Thus, for example, in West German Offenlegungsschrift No. 23 47 817, a nuclear reactor with a single passage of the spherical fuel elements is described, wherein in order to protect the endangered structural elements, materials absorbing neutrons or reducing their velocity are provided within the wall of the roof reflector and the wall of the upper part of the side reflector. These materials may be present in the form of rods and housed in corresponding cavities.

In all high temperature reactors operating with a single passage of the spherical fuel elements, the rod shaped absorber elements that may be inserted directly into the bed of the fuel elements are exposed at least over their lower portion to high thermal and fast neutron fluxes of the reactor core. This is because an axial power density distribution with its maximum in the upper third of the reactor core is established in reactors of this type. As the result of the neutron irradiation, the outer steel sheathing of the absorber elements is damaged, i.e. the material becomes embrittled. Consequently, the life of the sheathing materials in the reactor core is limited. The embrittlement may be traced to two processes:

1. The effect of the dose of fast neutrons which generates lattice damage in the material, and
2. the action of the dose of thermal neutrons, which produces helium embrittlement in the metal by means of the reaction of $Ni^{58}(n,\gamma) Ni^{59}(n\,\alpha)Fe^{56}$.

Estimates of the extent of embrittlement according to our present state of knowledge lead to the statement that the dose of fast neutrons permits a life of the absorber elements of eight years, but that because of the exposure to thermal neutrons this life of the absorber elements at the present time must be limited to four years.

SUMMARY OF THE INVENTION

It is the object of the present invention to attenuate the irradiation of the lower parts of the absorber elements by means of thermal neutrons in a gas cooled high temperature reactor of the type described hereinabove, so that damage to the absorber elements by the thermal electron flux will not be the only decisive factor of the useful life of the absorber elements.

The solution of the problem defined in this manner is characterized by utilization of a second group of absorber elements with a lower absorption capacity for thermal neutrons than that of the first group. The paired absorber elements are provided above the bed of fuel elements. The second group of absorber elements are of a tubular shape and movable between an upper and a lower terminal position. Each tubular absorber element surrounds a rod shaped absorber element and is moved with said rod shaped element in the same direction until its terminal position is reached. The lower terminal position of the tubular absorber elements is that position wherein the lower ends of the tubular absorber elements contact the surface area of the bed of fuel elements.

According to the invention, the tubular absorber elements protect the rod shaped absorber elements from irradiation by excessive doses of thermal neutrons. In this manner, the exposure of the sheathing material of the rod shaped absorber elements is transferred to the tubular absorber elements. However, because the latter move only to the surface of the bed and do not penetrate it, they are not exposed to primary stresses and therefore, in spite of the embrittlement of the material, long useful lives may be achieved. These lives are comparable to the useful life of absorber elements obtained in reactors with block like fuel elements.

In the case of rod shaped absorber elements only the parts located above the bed of fuel elements are protected by the tubular absorber elements. A substantial extension of the useful life of the rod shaped absorber elements is achieved because the elements are extended, during a large portion of their service time, only to a limited degree. The heavily stressed ends of the rods are limited to exposure above the bed of fuel elements within the tubular absorber elements. A substantial improvement in reactor maintenance cost is thereby also achieved.

In a high temperature reactor according to the invention, in order to compensate for density fluctuations of the xenon-135 fission product, the rod shaped absorber elements may be displaced within the cavity formed between the upper reflector and the surface of the bed of fuel elements (in rare instances the rod shaped absorber elements may be inserted into the bed of fuel elements to a depth of a few decimeters to obtain the necessary variation of reactivity). The excess reactivities required for operations under partial loads may also be controlled by means of rod shaped absorber elements displaced within the area over the bed of fuel elements.

Preferably, the high temperature reactor is arranged so that the rod shaped absorber elements are continually surrounded by the tubular absorber elements on their way through the cavity between the upper reflector and the surface of the bed of fuel elements. As long as the rod shaped absorber elements are moved within this area, the tubular absorber elements are moved in the same direction until their lower terminal position is attained. The tubular absorber elements retain this position even when the rod shaped absorber elements are inserted farther into the bed of fuel elements (to a terminal position of approximately 5 m in depth).

When the rod shaped absorber elements are subsequently removed from the bed of fuel elements, the tubular absorber elements are taken along into their high position by means of a coupling with the rod shaped absorber elements. According to the invention, the coupling in the form of a driving element is designed so that it begins to operate only when the lower ends of the two associated absorber elements are at the same height.

The downward motion of the tubular absorber elements may take place under the effect of the force of gravity. Conveniently, shoulders are provided on the tubular absorber elements at the appropriate height which abut against a stop, for example, the upper reflector, thus arresting the downward motion of the absorber elements.

For the purpose of guiding the upper part of the tubular absorber elements, preferably a bearing may be provided for each element, said bearing being installed, for example, in the thermal roof shield located above the reflector.

The tubular absorber elements are preferably made of steel and may have a wall thickness of, for example, 5 mm. This wall thickness effects an attenuation of the thermal neutrons by a factor of 2, i.e. the exposure of the rod shaped absorber elements to thermal neutrons has been reduced to the extent that their useful life is doubled. The dosage of both thermal and fast neutrons are simultaneously determined for control and shutdown purposes with respect to the useful life of absorber elements. A further advantage is the fact that the generation of heat in the rod shaped absorber elements is also reduced, specifically, to one half of its original value.

It is also possible to add small amounts of boron to the steel used in the tubular absorber elements in order to further enhance the absorbant effect of the absorber elements, i.e. to further reduce the dose of thermal neutrons. The proportional amount of boron may be 1 to 3%.

BRIEF DESCRIPTION OF THE DRAWINGS

In the drawings, an example of an embodiment of the high temperature reactor according to the invention is represented schematically by showing a section of a high temperature reactor comprising a part of the reactor control and shutdown installation. The drawings individually show the following.

DETAILED DESCRIPTION OF PREFERRED EMBODIMENTS

Figure 1:
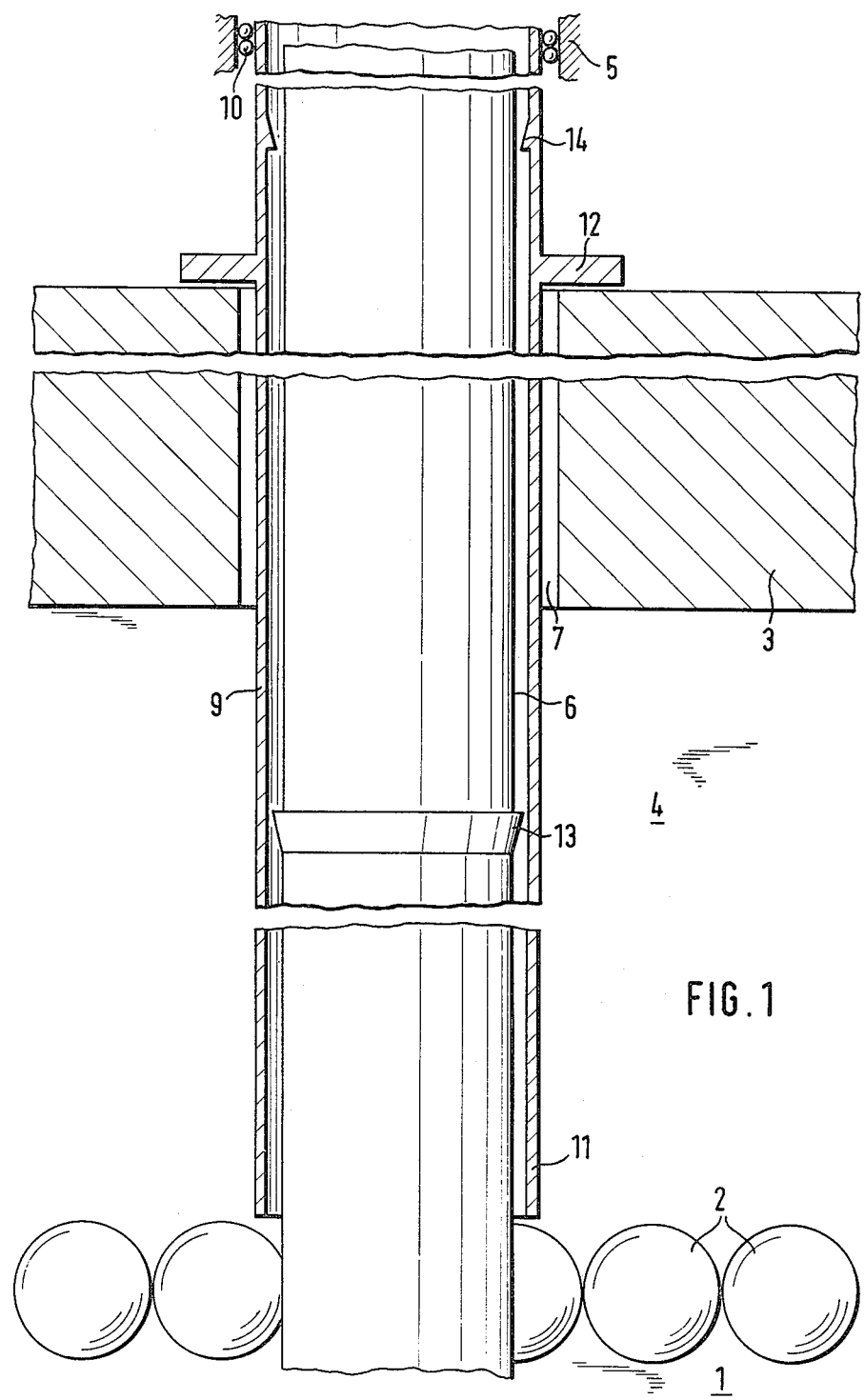
FIG. 1 represents a section of a reactor control and shutdown installation with a rod shaped absorber element, inserted in the bed of fuel elements, together with its associated tubular absorber element above the bed.

The gas cooled high temperature reactor of the drawings and according to the invention comprises a core formed by a bed 1 of spherical fuel elements 2. The bed 1 is surrounded on all sides by a reflector, with only the upper reflector 3 being shown here. Between the upper reflector 3 and the surface of the bed of fuel elements 1, there is a cavity 4. A thermal roof shield 5 is arranged above the upper reflector 3. The thermal roof shield 6 is only partially indicated in the drawings.

Figure 2:
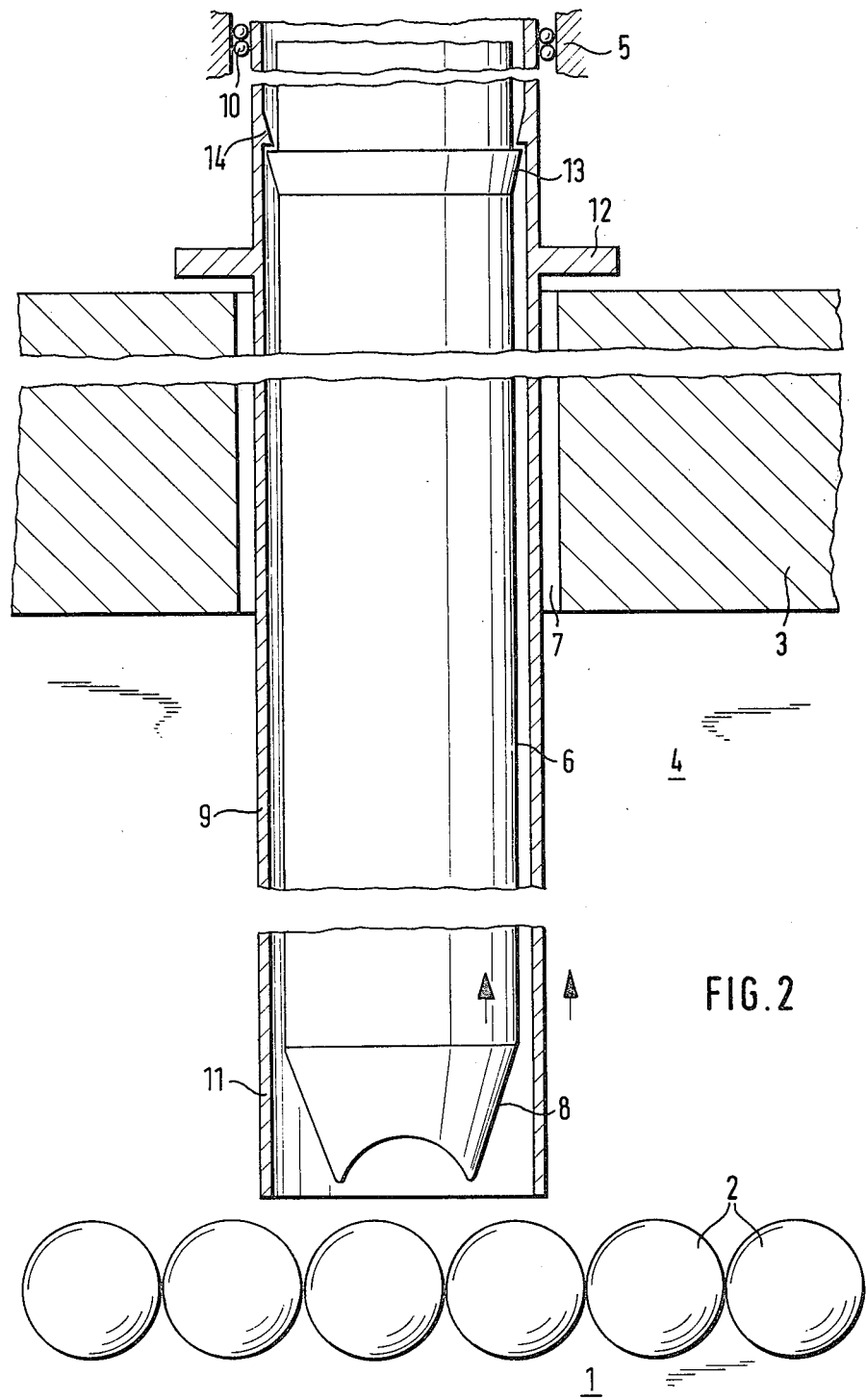
FIG. 2 depicts the rod shaped absorber element during its removal from the bed of fuel elements in the same arrangement as FIG. 1.

The specific components of the control and shutdown apparatus of the high temperature reactor according to the invention comprises a plurality of rod shaped absorber elements 6, which may be inserted through the bores 7 provided in the upper reflector 3 directly into the bed 1 of the fuel elements 2. They consist of an absorber material with an outer steel sheathing and an inner suspension tube. As shown in FIG. 2, the rod shaped absorber elements 6 in this example of embodiment have egg-cup-shaped tips 8. The drives for the absorber elements 6 are arranged above the thermal roof shield 5 (not shown).

For each rod shaped absorber element 6, a tubular absorber element 9 is provided, surrounding the rod shaped absorber element 6. The tubular absorber elements 9 consist of a material having an absorber capacity for thermal neutrons that is far less than the absorber material of the rod shaped absorber elements 6, for example, a steel with an addition of 1 to 3% boron. In the preferred embodiment they have wall thicknesses of approximately 5 mm and are guided through at least one bearing 10 each. The bearing 10 is installed in the thermal roof shield 5.

The tubular absorber elements 9 may be moved between an upper and a lower terminal position, whereby the lower terminal position is assumed by the tubular absorber elements 9 when their lower ends 11 are just touching the surface area of the bed 1 of the fuel elements. The motion of the tubular absorber elements 9 is in the same direction as that of the rod shaped absorber elements 6. The force of gravity may be utilized in one embodiment for the downward motion of the tubular absorber elements.

In order to arrest the absorber elements 9 after they have reached their lower terminal position, they are provided with shoulders 12, located at an appropriate height at their circumference. These shoulders 12 abut against a stop. The stop may preferably be the upper reflector 3 which is positioned to stop the downward travel of the tubular absorber elements 9 as soon as the ends 11 of the tubular absorber elements 9 contact the bed 1 of the fuel elements 2. The tubular absorber element 9 is shown in this position in FIG. 1. The corresponding rod shaped absorber element 6 is also in its lower terminal position in FIG. 1, i.e. it is inserted to a certain distance (not shown) into the bed 1 of the fuel elements 2. The partial section of the rod shaped absorber element 6 in the cavity 4 is completely surrounded by the tubular absorber element 9. In this manner, the rod shaped absorber element 6 is exposed merely to a strongly attenuated dose of thermal neutrons.

For their upward motion, the tubular absorber elements 9 are directly coupled with the corresponding rod shaped absorber elements 6. For this purpose a driving element is provided for each pair. The driving element consists, in the present embodiment, of an annular collar 13 located on the external circumference of the rod shaped absorber element 6 and a similar collar 14 on the inner wall of the tubular absorber element 9. The two collars 13 and 14 are mounted at a height in the absorber elements 6 and 9 so that the driving element becomes effective only when the lower end 11 of the tubular absorber element 9 is at the height of the tip 8 of the rod shaped absorber element 6. Well known mechanical and electrical devices are employed in the preferred embodiments for the insertion, removal and movement of the rods in the cavity 4 as well as into the bed 1. These devices are described, for example, in U.S. Pat. No. 4,148,685 and U.S. Ser. No. 848,603, the disclosures of which are hereby incorporated by reference.

In FIG. 2, a pair of a rod shaped absorber element 6 and a tubular absorber element 9 is shown at the moment of their interlocking, i.e. the two driving element parts 13 and 14 are engaging each other and the tubular absorber element 9 is carried by the rod shaped absorber element 6 in the upward direction. In this fashion the rod shaped absorber element is protected over the entire path to be covered in the cavity 4 by the tubular absorber element 9. This protection is also available to the rod shaped absorber elements 6 in their control and shutdown functions when they are being displaced within the cavity 4 for the purpose of absorbing excess reactivity.

Additional details of the component parts of the high temperature gas cooled nuclear reactor, such as the cooling system, the gas turbine arrangement, the work cycle and the specific core construction, to name a few, are also disclosed in the patents previously discussed in this specification. To the extent such patent descriptions are necessary for the understanding of this invention, they are incorporated herein by reference.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined in the claims.

We claim:

1. A gas cooled high temperature reactor comprising:
a core having a bed of single passage, spherical fuel elements;
a reflector surrounding the bed on all sides;
means for circulation of cooling gas through said core from top to bottom;
a plurality of control and shut-down absorber elements, said elements comprising a first group of absorber elements, in the shape of rods and directly insertable into the bed, a second group of absorber elements with a lesser capacity for the absorption of thermal neutrons than that of the first group of absorber elements, said second group of absorber elements having a tubular configuration and being movable between an upper and a lower terminal position, each of said second group of absorber elements surrounding one of said first group of absorber elements and capable of displacement in the same direction as the surrounded absorber element with a lower terminal position determined as the position wherein the lower end of said element contacts the surface of the bed of spherical fuel elements.

2. The gas cooled high temperature reactor of claim 1 wherein the rod shaped absorber elements are constantly surrounded in the cavity between the upper reflector and the surface of the bed of the fuel elements by the tubular absorber elements.

3. The gas cooled high temperature reactor of claim 1 wherein a coupling of each tubular absorber element with the corresponding rod shaped absorber element is effected during the upward motion of the rod shaped absorber element by a driving element activated when the lower end of the rod shaped absorber element is at the same height as the lower end of the tubular absorber element.

4. The gas cooled high temperature reactor of claim 1 wherein the downward motion of the tubular absorber elements takes place under the effect of the force of gravity and wherein said motion is arrested following the attainment of the lower terminal position by means of shoulders which abut against the upper reflector serving as a stop.

5. The gas cooled high temperature reactor of claims 1, 3 or 4 further comprising a thermal roof shield disposed above said upper reflector and wherein each of the tubular absorber elements are guided in the area of said thermal roof shield by at least one bearing.

6. The gas cooled high temperature reactor of claim 1 wherein the tubular absorber elements are made of steel and have a wall thickness of approximately 5 mm.

7. The gas cooled high temperature reactor of claim 1 wherein the tubular absorber elements are made of steel containing 1 to 3% boron.

* * * * *